455-610 AU 233 EX

9/29/81 XR 4,292,628

United States Patent [19]

Sadler

[11] 4,292,628

[45] Sep. 29, 1981

[54] FIBRE OPTIC SECURITY SYSTEM

[75] Inventor: John A. Sadler, Rexdale, Canada

[73] Assignee: Chubb Industries Limited, Toronto, Canada

[21] Appl. No.: 937,577

[22] Filed: Aug. 28, 1978

[51] Int. Cl.[3] .......... G08B 1/00; G02B 5/14

[52] U.S. Cl. .......... 340/531; 340/555; 340/556; 350/96.15; 356/432; 455/610; 250/551

[58] Field of Search .......... 340/531, 555, 556, 619; 250/199, 221; 350/96.1, 96.13, 96.15, 96.24; 358/901; 356/429, 430, 432, 433; 455/600, 603, 610, 611, 613, 618, 619

[56] References Cited

U.S. PATENT DOCUMENTS

| | | | |
|---|---|---|---|
| 3,452,205 | 6/1969 | Bogholtz | 250/221 |
| 3,605,082 | 9/1971 | Matthews | 340/556 |
| 3,633,035 | 1/1972 | Uchida | 350/96.24 |
| 3,717,769 | 2/1973 | Hubbard et al. | 350/96.15 |
| 3,882,887 | 5/1975 | Rekai | 340/619 |
| 3,924,253 | 12/1975 | Marino | 340/556 |
| 3,938,124 | 2/1976 | Way et al. | 340/531 |
| 3,981,592 | 9/1976 | Williams | 250/199 |
| 4,000,416 | 12/1976 | Goell | 250/199 |
| 4,012,149 | 3/1977 | Bouillie et al. | 350/96 C |
| 4,060,803 | 11/1977 | Ashworth | 340/555 |
| 4,070,091 | 1/1978 | Taylor et al. | 350/96 WG |
| 4,092,059 | 5/1978 | Hawkes et al. | 350/96.24 |

FOREIGN PATENT DOCUMENTS

| | | | |
|---|---|---|---|
| 1157706 | 7/1969 | United Kingdom | 340/555 |

*Primary Examiner*—John W. Caldwell, Sr.
*Assistant Examiner*—Donnie Lee Crosland
*Attorney, Agent, or Firm*—Ridout & Maybee

[57] ABSTRACT

In a security alarm system, connections between a local sensor unit or units and a control unit are established by flexible optical light fibre guides, a normal condition of a sensor being indicated by the maintenance of a light signal or signals passing through an associated guide from the sensor unit to the control unit where there is monitoring of at least one parameter of the signal which is dependent on the integrity of the guide.

4 Claims, 1 Drawing Figure

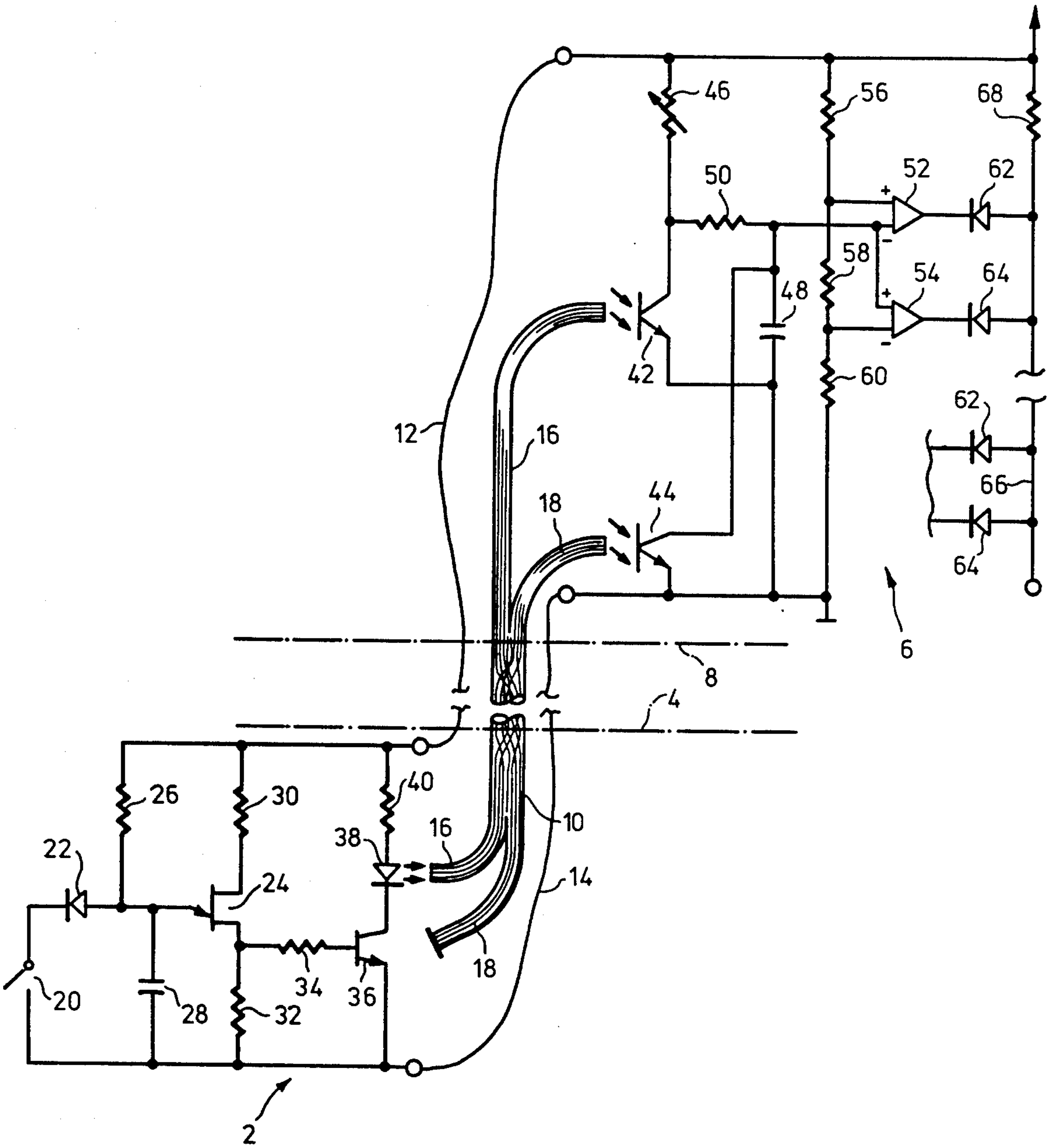
46
56
68
50
52
62
58
54
64
48
42
60
62
12
16
66
18
44
64
6
8
4
26
30
40
38
16
10
22
24
14
34
36
18
20
28
32
2

FIBRE OPTIC SECURITY SYSTEM

FIELD OF THE INVENTION

This invention relates to security alarm systems intended to provide warning of interference by intruders with items to be protected such as night depositories and safes, or doors and windows.

BACKGROUND OF THE INVENTION

Security alarm systems commonly comprise appropriate sensor units associated with items to be protected against intrusion, which may either be some form of switch or circuit maker or breaker responding to interference by intruders with the item to be protected, or some form of transducer responding to deviation outside a predetermined limit of some condition associated with the item to be protected or its environment, e.g. light or movement detectors. In each case, an alarm condition will normally be signified by either the sending or the interruption of an electrical signal. The signals from the sensor unit or units are usually directed to a control unit in the vicinity of the item or items to be protected, and this control unit may contain an alarm responsive to an abnormal sensor unit signal, and/or a signal may be electrically transmitted to a remote point to be monitored for abnormalities. In the latter case, the security alarm signal may be encoded, for example by modulation with a pseudo-random digital sequence, to improve its security. Unfortunately encoding systems providing a high degree of security for electrical signals are relatively expensive and are usually economically impractical for application to the local connections between the sensors and the control units, which connections thus often form the weakest link in an otherwise secure system.

SUMMARY OF THE INVENTION

The present invention is concerned with providing a low cost means of improving the security of the links between the sensors and a control unit in an intrusion alarm system. According to the invention, connections between the sensor units and the control unit are established by flexible optical light fibre guides, a signal of predetermined parameters is passed through the guide from each sensor to the control unit to indicate a normal condition of the sensor, and at least one parameter of the signal which is dependent on the integrity of the light guide is monitored at the control unit.

It is difficult to tap a signal from an optical fibre without significantly attenuating the signal, because of the necessity for physical coupling to the fibre core, or accurately to sense the amplitude because of the difficulty of establishing a covert tape of accurately known transmission characteristics, or to establish a bridge across a section of fibre to enable the latter to be cut for similar reasons. Moreover, in a multiple fibre guide, where different fibres may carry different signals, these problems are multiplied. Thus if a signal of predetermined amplitude is transmitted from a sensor to the control unit, it is difficult for an intruder trying to circumvent the alarm, and with access only to the light guide, to determine the amplitude of the signal so as to provide a substitute signal. This difficulty is compounded if the signal is a pulse signal of predetermined frequency and duty ratio, or is otherwise modulated in some predetermined manner, and it is further compounded if the light guide is comprised of a bundle of fibres, some of which carry the signal and some of which carry no signal, the non-signal carrying fibres being monitored for the absence of the signal.

SHORT DESCRIPTION OF THE DRAWING

The accompanying drawing is a partial schematic diagram of a preferred embodiment of an alarm system in accordance with the invention, showing one sensor unit and the relevant parts of a control unit.

DESCRIPTION OF THE PREFERRED EMBODIMENT

Referring to the drawing, a sensor unit 2 within an enclosure 4, which may for example be a safe, vault, room or other item to be protected from intrusion is connected to a control unit 6 within a remote enclosure 8 by a connection comprising a flexible optical light fibre guide 10 and positive and negative electrical supply lines 12 and 14. The guide 10 consists of a bundle of individual fibres formed of two sub-bundles 16 and 18, the fibres of the sub-bundles being intermingled in the portion of the guide 10 between the enclosures.

The intrusion sensor unit 2 comprises the sensor unit proper, shown here as normally open switch 20 connected in series with a diode 22 so as to disable on closing a conventional relaxation oscillator comprising a unijunction transistor 24, a resistor 26 and a capacitor 28 setting a time constant, and resistors 30 and 32 setting the triggering point of the transistor. The output pulses from the first base of the transistor are passed via a resistor 34 to the base of a transistor 36, the collector load of which comprises a light emitting diode (LED) 38 and a current limiting resistor 40. The LED 38 is optically coupled to the fibres of the sub-bundle 16, whilst no light is permitted to enter the fibres of the sub-bundles 18.

In the enclosure 8, the fibres of the sub-bundle 16 and 18 are optically coupled to the photo-transistors 42 and 44 respectively. Since no light is permitted to enter the fibres of sub-bundle 18 at the enclosure 4, photo-transistor 44 will normally remain turned off, unless some attempt to interfere with the guide 10 or to introduce a substitute signal therein results in light entering fibres of the sub-bundle, in which case the transistor will turn on.

The collector of photo-transistor 42 is connected to the positive line 12 via a variable resistor 46 and to a capacitor 48 via a resistor 50. When the transistor is turned off, i.e. the LED 38 is off and therefore no light is passing through the sub-bundle 16, the capacitor 48 will charge through resistors 46 and 50. When the LED 38 is on, the capacitor will discharge through the resistor 50 and the resistance of the transistor 42, which will depend on the intensity of the light transmitted through the sub-bundle 16. As long as this intensity and the duration and frequency of the pulses from the relaxation oscillator remain unchanged, the capacitor will charge to an equilibrium potential which may be set to about half the line potential by means of the variable resistor 46. This equilibrium potential is applied to the inverting and non-inverting inputs respectively of two comparators 52, 54, the other inputs of which are potentials taken from a potentiometer formed by resistors 56, 58, 60 selected so that the reference potentials are respectively a predetermined margin above and below the equilibrium potential. Any excessive deviation of the potential on capacitor 48 will thus cause one of the comparator outputs to go low. The comparator outputs are ORed by diodes 62, 64 to a common output line 66 connected to the line 12 by a pull-up resistor 68. Thus any excessive deviation in the frequency, pulse length or amplitude of the signal reaching the transistor 42 will cause the output line 66 to go low, as will conduction of the photo-transistor 44 which is connected across the capacitor 48.

Other similar sensor units may be monitored on the output line 66, circuits similar to that already described being ORed thereto by further pairs of diodes 62, 64 as shown.

It will be apparent to those skilled in the art that the above embodiment is susceptible to wide range of modification. Thus the switch 20 may be replaced by any normally off or normally on device responsive to some threshold condition in the item being monitored for intrusion and connected so as to disable the oscillator in the event of an abnormal condition being detected. A wide range of different types of oscillators or signal generators may be utilized to modulate the output of the LED 38, and the unit 2 could have an independent power supply, thus dispensing with the need for the lines 12 and 14. If a lesser degree of security is tolerable, a direct current could be applied to the LED so that only the amplitude of the light signal would be monitored, the sub-bundle 18 could be eliminated, and/or the sub-bundle 16 reduced to a single fibre. As in the case of the unit 2, the construction of the unit 6 may also be varied, provided that the function is maintained of monitoring and responding to abnormal deviation of some parameter of the optical signal which is dependent on the integrity of the light guide 10.

Instead of incorporating an oscillator in the unit 2, it could be incorporated in the control unit 6, and a sub-bundle of fibres in the guide 10 used to transmit the modulating signal to the unit 2 by means of suitable optoelectronic transmitting and receiving devices such as a LED and phototransistor. The received signal would then be utilised to modulate the LED 38, either with or without inversion or other modification.

What I claim is:

1. In a security alarm system comprising at least one sensor unit, a control unit, a connection between the sensor unit and the control unit, and an alarm circuit conditionable by said control unit to an alarm condition, the sensor unit being operative to apply a signal to the connection and to switch that signal from a normal state in response to sensing an abnormal condition, and the control unit being operative to monitor said signal for deviation from its normal state and to condition said alarm circuit in response to detection of such a deviation, the improvement in which the sensor unit includes an optoelectronic transmitter and the control unit includes first and second optoelectronic receivers, the said connection is established by a flexible optical light fibre guide coupled to said optoelectronic transmitter in the sensor unit and said first optoelectronic receiver in the control unit for transmission of said signal in the form of light from the sensor unit for reception by the control unit, and the control unit monitors at least one parameter of the signal in its normal state which is dependent upon the optical integrity of the guide for deviation outside predetermined limits, the optical fibres of said guide form two sub-bundles the fibres of which are intermingled intermediate the ends of the guide, one of the two sub-bundles being optically coupled to said transmitter and said first receiver and the other of the two sub-bundles being optically coupled to said second optoelectronic receiver but isolated from said transmitter.

2. In a security alarm system in which a sensor unit for sensing an alarm condition is linked by a signalling path to alarm control means at a second location, said sensor unit including means operative to apply a normal signal condition to said path at said first location for transmission via said path for reception by said alarm control means, and switch means responsive to the sensing of the alarm condition to effect change in the said applied signal condition, and in which the alarm control means includes a condition responsive alarm circuit, and signal-receiving means coupled to said signalling path at said second location to condition said alarm circuit for response upon sensing change from said normal signal condition as received from said path by said alarm control means, the improvement wherein said signalling path is a fibre-optic light guide extending between said first and second locations, the means included by said sensor unit for applying a signal condition to said path comprise light-emitting means at said first location continuously coupled to said guide for transmitting a light signal within said guide from said first location towards said second location, and said signal-receiving means includes means for responding to change in the light signal received from said guide at said second location to condition said alarm circuit for response, and wherein the light guide comprises a plurality of optical fibres, the said sensor unit transmits the said light signal into only some of the said optical fibres of the light guide, and said alarm control means includes means to condition said alarm circuit for response upon reception of said light signal from the others of said optical fibres.

3. In a security alarm system in which a sensor unit for sensing an alarm condition is linked by a signalling path to alarm control means at a second location, said sensor unit including means operative to apply a normal signal condition to said path at said first location for transmission via said path for reception by said alarm control means, and switch means responsive to the sensing of the alarm condition to effect change in the said applied signal condition, and in which the alarm control means includes a condition respective alarm circuit, and signal-receiving means coupled to said signalling path at said second location to condition said alarm circuit for response upon sensing change from said normal signal condition as received from said path by said alarm control means, the improvement wherein said signalling path is a fibre-optic light guide extending between said first and second locations, the means included by said sensor unit for applying a signal condition to said path comprise light-emitting means at said first location continuously coupled to said guide for transmitting a light signal within said guide from said first location towards said second location, and said signal-receiving means includes means for responding to change in the light signal received from said guide at said second location to condition said alarm circuit for response, and wherein the light guide comprises two sub-bundles of optical fibres that are intermingled with one another between the said sensor unit and the said alarm control means, and wherein the sensor unit transmits the said light signal into only a first of the two sub-bundles and the alarm control means includes sensing means associated with said second sub-bundle to condition said alarm circuit for response upon sensing light output from said second sub-bundle.

4. A security alarm system according to claim 3, wherein the alarm control means includes first and second light-responsive devices for responding electrically to light output of the first and second sub-bundles respectively, a signal-deriving circuit coupled to said first light-responsive device to derive an electrical signal having a magnitude dependent on at least one parameter of light received by said first light-responsive device from said first sub-bundle, an electrical monitoring circuit for monitoring the magnitude of this derived signal to condition said alarm circuit for response upon departure of the signal magnitude from a predetermined range, the said second light-responsive device being coupled to the said signal-deriving circuit to cause the derived signal-magnitude to depart from said range in response to reception by said second light-responsive device of light from the said second sub-bundle.

* * * * *